(12) United States Patent
Han et al.

(10) Patent No.: US 11,804,241 B2
(45) Date of Patent: Oct. 31, 2023

(54) ELECTRONIC APPARATUS AND CONTROLLING METHOD THEREOF

(71) Applicant: SAMSUNG ELECTRONICS CO., LTD., Suwon-si (KR)

(72) Inventors: Jubum Han, Suwon-si (KR); Changwoo Han, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 12 days.

(21) Appl. No.: 17/578,184

(22) Filed: Jan. 18, 2022

(65) Prior Publication Data

US 2022/0199110 A1 Jun. 23, 2022

Related U.S. Application Data

(63) Continuation of application No. PCT/KR2021/012902, filed on Sep. 17, 2021.

(30) Foreign Application Priority Data

Dec. 21, 2020 (KR) .......................... 10-2020-0179419

(51) Int. Cl.
*G10L 21/00* (2013.01)
*G10L 25/78* (2013.01)
(Continued)

(52) U.S. Cl.
CPC .............. *G10L 25/78* (2013.01); *G10L 15/16* (2013.01); *G10L 25/54* (2013.01);
(Continued)

(58) Field of Classification Search
CPC ......... G10L 25/51; G10L 25/54; G10L 25/78; G10L 15/16; G10L 15/22;
(Continued)

(56) References Cited

U.S. PATENT DOCUMENTS 9,116,984 B2 8/2015 Caldwell et al.
10,397,736 B2 8/2019 Lee et al.
(Continued)

FOREIGN PATENT DOCUMENTS

JP 1076949 A 3/1998
JP 200167091 A 3/2001
(Continued)

OTHER PUBLICATIONS

International Search Report (PCT/ISA/210) dated Dec. 8, 2021 issued by the International Searching Authority in International Application No. PCT/KR2021/012902.
(Continued)

*Primary Examiner* — Md S Elahee
(74) *Attorney, Agent, or Firm* — Sughrue Mion, PLLC

(57) ABSTRACT

An electronic apparatus and a controlling method thereof are provided. The controlling method includes, based on an audio signal being received through a microphone, determining whether a user is on a public transport; detecting whether the audio signal includes a voice signal output through an acoustic device of the public transport; determining whether the voice signal from the acoustic device includes a voice signal for guiding at least one stop from among a plurality of stops; and outputting information on the at least one stop.

9 Claims, 7 Drawing Sheets

(51) Int. Cl.
  *G10L 25/54*    (2013.01)
  *G10L 15/16*    (2006.01)
  *H04M 1/72409*  (2021.01)
  *H04R 1/10*     (2006.01)
  *H04W 4/024*    (2018.01)
  *H04M 1/60*     (2006.01)

(52) U.S. Cl.
  CPC ... *H04M 1/6066* (2013.01); *H04M 1/724097* (2022.02); *H04R 1/1016* (2013.01); *H04W 4/024* (2018.02); *H04M 2201/40* (2013.01)

(58) Field of Classification Search
  CPC ......... G10L 2015/221; G10L 2025/783; G10L 2015/088; G10L 13/027; H04M 1/6066; H04M 1/724097; H04M 1/72454; H04M 2201/40; H04M 2250/74; H04W 4/024; H04W 4/42; H04R 1/1041; H04R 1/1016; H04R 2420/07; B60R 21/01534
  USPC ....................................................... 704/233
  See application file for complete search history.

(56) References Cited

U.S. PATENT DOCUMENTS 10,496,365 B2    12/2019   Tanabe et al.
2022/0242352 A1*  8/2022   Nagata .............. B60R 21/01534

FOREIGN PATENT DOCUMENTS

| JP | 200778911 A    | 3/2007  |
| JP | 2012175647 A   | 9/2012  |
| JP | 2018129664 A   | 8/2018  |
| KR | 1020060095346 A | 8/2006  |
| KR | 101643861 B1   | 7/2016  |
| KR | 1020190016834 A | 2/2019  |
| KR | 101960115 B1   | 3/2019  |
| KR | 1020190110939 A | 10/2019 |

OTHER PUBLICATIONS

Written Opinion (PCT/ISA/237) dated Dec. 8, 2021 issued by the International Searching Authority in International Application No. PCT/KR2021/012902.

* cited by examiner

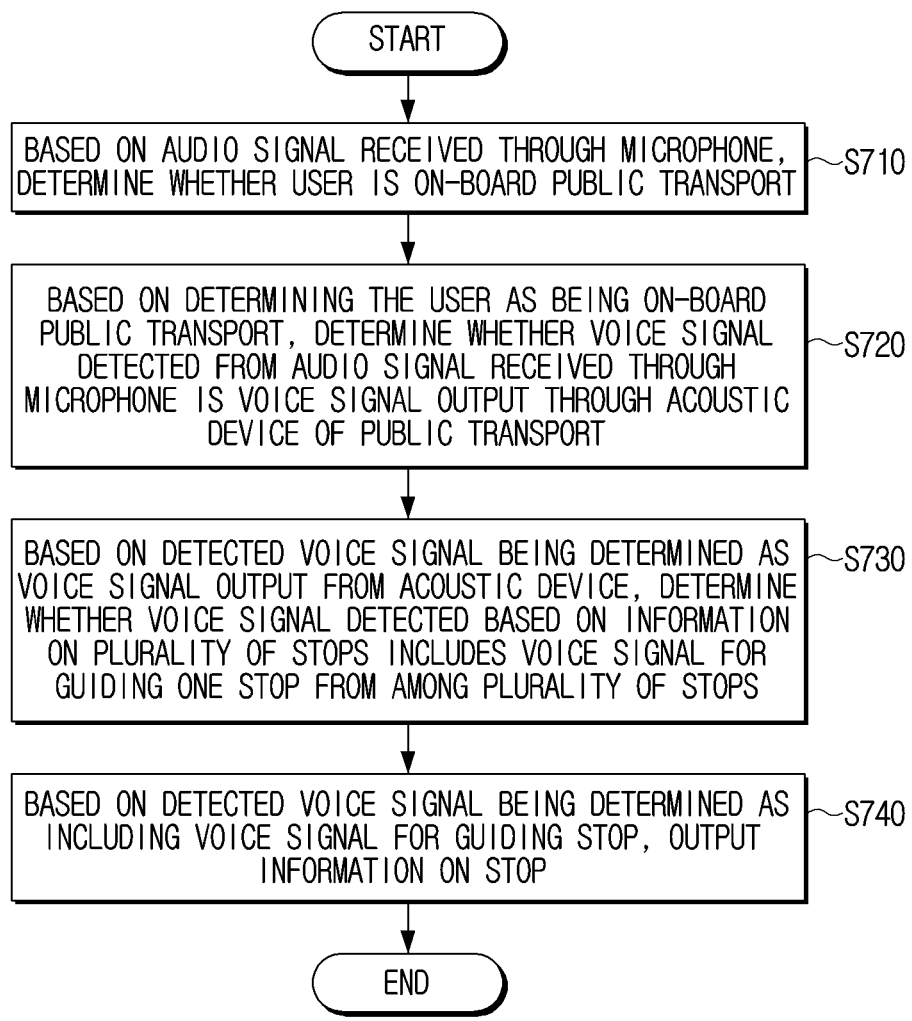

ELECTRONIC APPARATUS AND CONTROLLING METHOD THEREOF

CROSS-REFERENCE TO RELATED APPLICATION(S)

This application is a bypass continuation of International Application No. PCT/KR2021/012902, filed on Sep. 17, 2021, which is based on and claims priority to Korean Patent Application No. 10-2020-0179419, filed on Dec. 21, 2020, in the Korean Intellectual Property Office, the disclosures of which are incorporated by reference herein in their entireties.

BACKGROUND

1. Field

The disclosure relates to an electronic apparatus and a controlling method thereof. More particularly, the disclosure relates to an electronic apparatus configured to collect and provide ambient voice information and a controlling method thereof.

2. Description of the Related Art

Recently, electronic apparatuses such as wireless earphones and wireless headphones which output audio signals received through wireless communication from a mobile device are being commercialized.

However, while a user is wearing and using the electronic apparatus, there may be a situation in which the user misses important information (e.g., stop to get off, etc.) because of difficulty in acquiring voice information (e.g., announcement broadcast, or the like in the public transportation when the user is on-board) in the user surroundings. In order for the user to pay attention to the surroundings while using electronic apparatuses such as wireless earphones and wireless headphones, the user may have to stop using the electronic apparatus in order to acquire ambient voice information. Therefore, it is convenient for the user to turn off the electronic apparatus in order to listen to the surroundings or constantly pay attention to the surroundings while using the electronic apparatus.

SUMMARY

Provided is an electronic device configured to collect ambient voice information and output the collected voice information, and a controlling method thereof.

According to an embodiment, there is provided an electronic apparatus including: a microphone; an output interface; a memory configured to store information on a plurality of stops; and a processor configured to: based on an audio signal received through the microphone, determine whether a user is on a public transport; based on determining that the user is on the public transport, detect whether the audio signal includes a voice signal output through an acoustic device of the public transport; based on detecting that the voice signal is output from the acoustic device of the public transport, determine whether the voice signal output from the acoustic device of the public transport, comprises a voice signal for guiding at least one stop from among the plurality of stops according to the information on the plurality of stops; and based on determining that the voice signal output from the acoustic device of the public transport, includes the voice signal for guiding the at least one stop, control the output interface to output information on the at least one stop.

The processor is further configured to, based on detecting the voice signal output from the acoustic device of the public transport, perform an operation of determining whether the voice signal output from the acoustic device of the public transport, comprises the voice signal for guiding the at least one stop and an operation of performing voice recognition on the voice signal output from the acoustic device of the public transport, in parallel.

The processor is further configured to, based on determining that the voice signal output from the acoustic device of the public transport comprises the voice signal for guiding the at least one stop, terminate the voice recognition.

The processor is further configured to, based on the voice signal output from the acoustic device of the public transport, being determined as not comprising the voice signal for guiding the at least one stop, continue performing the voice recognition, and based on the voice recognition being completed, obtain information corresponding to a result of the completed voice recognition, and control the output interface to output the obtained information.

the processor is further configured to determine whether the user is on-board the public transport at a first pre-set time interval based on the audio signal received through the microphone, based on the user being on-board the public transport, detect a voice from the audio signal received through the microphone at a second pre-set time interval which is shorter than the first pre-set time interval, and determine whether the detected voice is the voice signal output from the acoustic device of the public transport.

wherein the memory is configured to store an artificial intelligence model trained to determine whether the user is on the public transport, and wherein the processor is further configured to input the audio signal received through the microphone to the artificial intelligence model, and determine whether the user is on the public transport through an output of the artificial intelligence model.

The processor is further configured to: based on determining that the user is on the public transport, detect a section of the audio signal in which a level of the audio signal received through the microphone exceeds a pre-set level, and determine the section of the audio signal as the voice signal.

The electronic apparatus further includes: a communicator; wherein the processor is configured to: based on the voice signal output from the acoustic device of the public transport being determined as comprising the voice signal for guiding the at least one stop, control the communicator to transmit the voice signal for guiding the at least one stop to an external apparatus for voice recognition, and based on receiving a result of the voice recognition through the communicator from the external apparatus, control the output interface to output the received information.

According to an embodiment, there is provided a control method of an electronic apparatus. The method includes: based on an audio signal being received through a microphone, determining whether a user is on a public transport; based on determining that the user is on the public transport, detecting whether the audio signal includes a voice signal output through an acoustic device of the public transport; based on detecting the voice signal output from the acoustic device of the public transport, determining whether the voice signal output from the acoustic device of the public transport, comprises a voice signal for guiding at least one stop from among a plurality of stops; and based on determining that the voice signal output from the acoustic device of the public transport, includes the voice signal for guiding the at least one stop, outputting information on the at least one stop.

The method further includes: based on detecting the voice signal output from the acoustic device of the public transport, determining whether the voice signal from the acoustic of the public transport device comprises the voice signal for guiding the at least one stop and performing voice recognition on the voice signal for guiding the at least one stop, in parallel.

The outputting information on the at least one stop comprises, based on determining that the voice signal output from the acoustic device of the public transport comprises the voice signal for guiding the at least one stop, terminating the voice recognition.

The method further includes: based on determining that the voice signal output from the acoustic device of the public transport does not include the voice signal for guiding the at least one stop, continue performing the voice recognition; based on the voice recognition being completed, obtaining information corresponding to a result of the completed voice recognition; and outputting the obtained information.

The determining whether the user is on the public transport comprises determining whether the user is on the public transport at a first pre-set time interval based on the audio signal received through the microphone, and wherein the detecting whether the audio signal includes the voice signal output from an acoustic device of the public transport comprises, based on determining that the user is on the public transport, detecting a voice signal from the audio signal received through the microphone at a second pre-set time interval which is shorter than the first pre-set time interval, and determining whether the voice signal is the voice signal output from the acoustic device of the public transport.

The electronic apparatus is configured to store an artificial intelligence model trained to determine whether the user is on the public transport, and wherein the determining whether the user is on the public transport comprises inputting the audio signal received through the microphone to the artificial intelligence model, and determining whether the user is on the public transport through an output of the artificial intelligence model.

The method further includes: based on determining that the user is on the public transport, detecting a section of the audio signal in which a level of the audio signal received through the microphone exceeds a pre-set level, and determining the section of the audio signal as the voice signal.

According to the various embodiments of the disclosure as described above, an electronic apparatus for collecting and outputting ambient voice information and a controlling method thereof may be provided.

In addition, guidance information which is output from an acoustic device of a public transport may be conveniently provided to the user on-board the public transport.

BRIEF DESCRIPTION OF THE DRAWINGS

FIG. 7 is a diagram illustrating a flowchart according to an embodiment.

DETAILED DESCRIPTION

Figure 1:
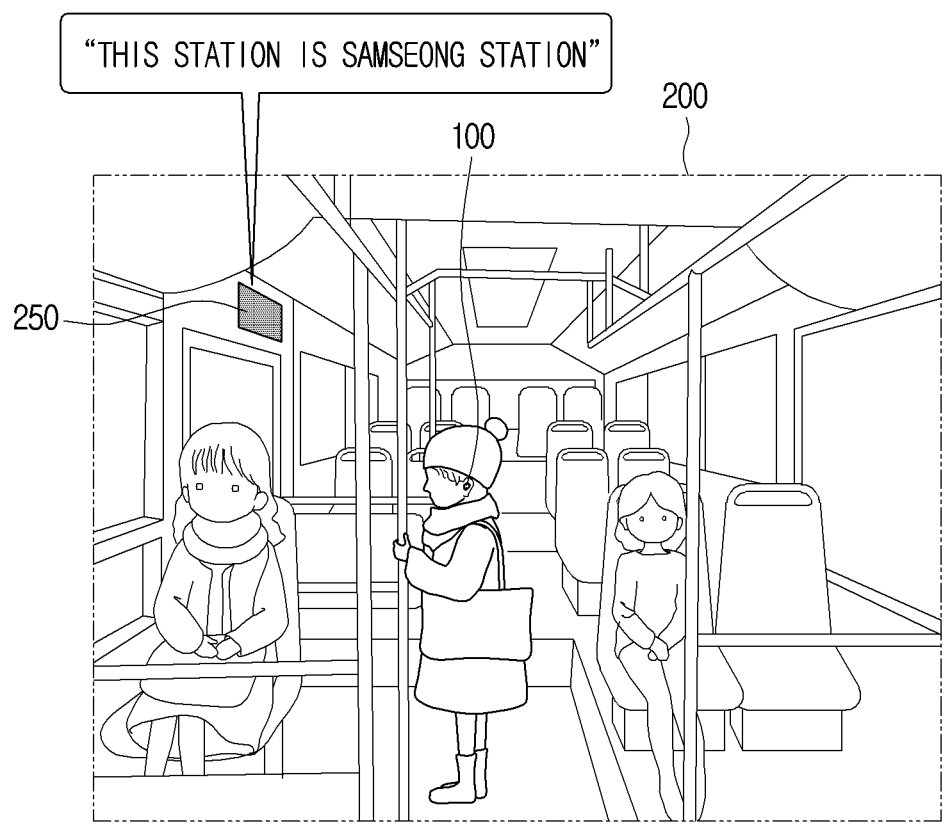
FIG. 1 is a schematic diagram illustrating an environment in which an electronic apparatus is used, according to an embodiment.

In the disclosure, a detailed description of known technologies that may unnecessarily obscure the gist of the disclosure will be omitted. In addition, one or more embodiments described below may be modified to various other forms, and it should be understood that the technical concept of the disclosure is not limited to the embodiments below.

The one or more embodiments herein are not intended to limit the scope of the disclosure, but should be interpreted as including any modifications, improvements, replacements and equivalents thereof. In the disclosure, like reference numerals may refer to like elements.

Expressions such as "first", "second", "1st," "2nd," or so on used herein may be used to refer to various elements regardless of order and/or importance, and it should be noted that the expressions are merely used to distinguish one element from another element and not to limit the elements.

In the disclosure, expressions such as "A or B," "at least one of A and/or B," or "one or more of A and/or B" may include all possible combinations of the items listed together. For example, "A or B," "at least one of A and B," or "at least one of A or B" may refer to all cases including (1) at least one A, (2) at least one B, or (3) both of at least one A and at least one B.

In the disclosure, a singular expression includes a plural expression, unless otherwise specified. It is to be understood that the terms such as "comprise" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

When a certain element (e.g., first element) is indicated as being "(operatively or communicatively) coupled with/to" or "connected to" another element (e.g., second element), it may be understood as the certain element being directly coupled with/to the other element or as being coupled through another element (e.g., third element). On the other hand, when a certain element (e.g., first element) is indicated as "directly coupled with/to" or "directly connected to" another element (e.g., second element), it may be understood as another element (e.g., third element) not being present between the certain element and the other element.

The expression "configured to . . . (or set up to)" used herein may be used interchangeably with, for example, "suitable for . . . ," "having the capacity to . . . ," "designed to . . . ," "adapted to . . . ," "made to . . . ," or "capable of . . . " based on circumstance. The term "configured to . . . (or set up to)" may not necessarily mean "specifically designed to" in terms of hardware. Rather, in a certain circumstance, the expression "a device configured to . . . " may mean that the device "may perform . . . " together with another device or components. For example, the phrase "a processor configured to (or set up to) perform A, B, or C" may mean a dedicated processor for performing a corresponding operation (e.g., embedded processor), or a generic-purpose processor (e.g., a central processing unit (CPU) or an application processor) capable of performing the corresponding operations by executing one or more software programs stored in the memory device.

FIG. 1 is a diagram illustrating an environment in which an electronic apparatus is used, according to an embodiment.

Referring to FIG. 1, the electronic apparatus 100 according to an embodiment may be configured to output an audio signal. For example, the electronic apparatus 100 may be configured to output an audio signal which is stored in the electronic apparatus 100 or processed by the electronic apparatus 100. In another example, the electronic apparatus 100 may be configured to receive an audio signal from an external apparatus which is coupled by a wire or wireless means and output the received audio signal.

To this end, the electronic apparatus 100 may be implemented as an earphone or a headphone which outputs acoustic information while worn in ears of a user or covering the ears of the user. In addition, the electronic apparatus 100 may be implemented as a wearable device such as a head mounted display (HMD) device and glasses. Also, the electronic apparatus 100 may be implemented as a device such as, for example, and without limitation, a smartphone, a tablet personal computer (tablet PC), or the like.

The electronic apparatus 100 may be configured to receive ambient audio signals. The ambient audio signals may refer to surrounding audio signals of the electronic apparatus 100. Specifically, the electronic apparatus 100 may be configured to receive the ambient audio signals continuously. The electronic apparatus 100 may be configured to obtain the surrounding audio signal, or receive the surrounding audio signal obtained by an external apparatus from the external apparatus.

The user may experience difficulty in listening to the ambient sounds of the outside due to the audio signals or the like output from the electronic apparatus 100. In order to prevent the above-described problem, the electronic apparatus 100 may be configured to collect the ambient sounds of the electronic apparatus 100 through an ambient sound allowance mode and output as an audio signal. However, the ambient sound allow mode may cause inconvenience to the user since this mode may pick up noises (e.g., conversation between others, engine sounds of vehicles, etc.) that may not be relevant to certain important messages. For example, when the user is on-board the public transport 200, the user may experience difficulty in listening to important information such as a name of a stop announced during a ride.

The electronic apparatus 100 according to an embodiment may be configured to collect and output guidance information which is provided by the public transport 200 to the user on-board.

The public transport 200 may include, for example, and without limitation, a bus, a subway, a train, a plane, an automobile, a boat, or the like. The public transport 200 may travel by stopping at a plurality of stops for one or more users to get on and get off.

The public transport 200 may include an acoustic device 250 (or a speaker), and provide guidance information through the audio signal output from the acoustic device 250. Here, the guidance information may include at least one from among information for guiding a stop or a station (hereinafter, referred to as station) at which the public transport 200 stops, information for preventing safety accidents, information notifying disaster occurrence, information notifying delay in departure of public transport 200, or the like. In addition, the voice signal may be recorded or stored by a service provider of the public transport 200, or generated by Text to Speech (TTS).

According to the various embodiments, the electronic apparatus 100 for selectively outputting ambient voice information and the controlling method thereof may be provided. In addition, the guidance information which is output from the acoustic device of the public transport 200 may be conveniently provided to the user who is using the public transport 200.

An embodiment of the disclosure will be described in greater detail below with reference to the accompanied drawings.

Figure 2:
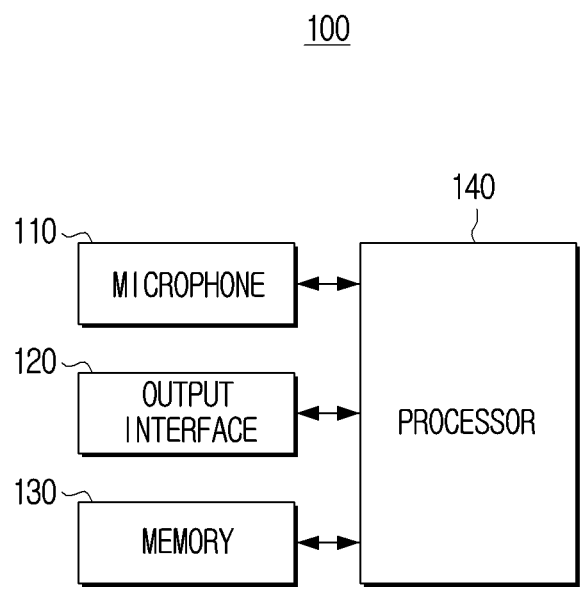
FIG. 2 is a block diagram illustrating an electronic apparatus according to an embodiment.

FIG. 2 is a block diagram illustrating an electronic apparatus according to an embodiment.

Referring to FIG. 2, the electronic apparatus 100 may include a microphone 110, an output interface 120, a memory 130, and a processor 140.

The microphone 110 may be configured to receive the ambient sound as audio signals. The microphone 110 may be configured to consecutively receive audio signals. The audio signal may include information on a specific frequency per respective times, amplitude, oscillation frequency, and waveform, and a form of the audio signal may be an analog signal or a digital signal.

The output interface 120 may be configured to output information. The output interface 120 may be configured to output information in an auditory form through vibrations, or output information in a visual form. For example, the output interface 120 may be configured to output information in an audio, or display information in an image.

The memory 130 may be configured to store information. For example, information on a plurality of stops including identification information of stops (e.g., name, identifier, etc.) and audio information on the corresponding stop (e.g., pronunciation information, etc.) may be stored in the memory 130. In addition, the memory 130 may be configured to map the identification information of the stops with the audio information on the corresponding stop and store in a table form.

The processor 140 may be configured to control the overall operation of the electronic apparatus 100. The processor 140 may be implemented as a generic-purpose processor such as a central processing unit (CPU) and an application processor (AP), a graphics dedicated processor such as a graphic processing unit (GPU) and a vision processing unit (VPU), an artificial intelligence dedicated processor such as a neural processing unit (NPU), or the like. In addition, the processor 140 may include a volatile memory for loading at least one instruction or module.

For example, the processor 140 may be configured to determine whether the user is on-board the public transport 200 based on the audio signal received through the microphone 110, determine whether the voice signal detected in the audio signal received through the microphone 110 is a voice signal output through the acoustic device 250 of the public transport 200 based on the user being determined as on-board the public transport 200, determine whether the voice signal detected based on the information on the plurality of stops is included in a voice signal for guiding one stop from among the plurality of stops based on the detected voice signal being determined as the voice signal output from the acoustic device 250, and control the output interface 120 to output information on the stop based on the detected voice signal being determined as including the voice signal for guiding the stop.

Specifically, the processor 140 may be configured to determine, based on the audio signal received through the microphone 110, whether the user is on-board the public transport 200.

In an embodiment, the memory 130 may be configured to store an artificial intelligence (AI) model trained to determine whether the user is on-board the public transport 200 based on an audio signal output by the acoustic device of the public transport 200.

The artificial intelligence model may be trained to find a condition (e.g., weight function, loss function, etc.) for a specific output data to be output when a specific input data is input, and learning data of the artificial intelligence model of the disclosure may include sample audio signal representing sound in the public transport 200 and may be input to the artificial intelligence model as input data. In addition, the learning data of the artificial intelligence model may include information which shows the user on-board the public transport 200 as result data. That is, the artificial intelligence model may be trained to output information which shows whether the user in on-board the public transport 200 when the audio signal is input. The artificial intelligence model may be trained according to learning algorithms of various methods such as supervised learning which uses input data and result data, un-supervised learning which learns by using input data, and reinforcement learning which learns by reward rather than result data.

The processor 140 may be configured to input the audio signal received through the microphone 110 to the artificial intelligence model. The processor 140 may be configured to determine whether the user is on-board the public transport 200 through an output of the artificial intelligence model.

For example, the trained artificial intelligence model may be configured to output a probability value (e.g., a value between 0 and 1) of the user being on-board the public transport 200 when the audio signal is input, and the processor 140 may be configured to determine that the user is on-board the public transport 200 based on the probability value output from the artificial intelligence model being greater than or equal to a pre-set value (e.g., 0.8, etc.), and determine that the user is not on-board the public transport 200 based on the probability value output from the artificial intelligence model being less than the pre-set value.

In an embodiment, the processor 140 may be configured to determine, based on the audio signal received through the microphone 110, whether the user is on-board the public transport 200 at every first pre-set time intervals. That is, the first pre-set time interval may represent a period of time for performing a corresponding operation. The first pre-set time interval may be a value pre-set by a manufacturer or the user, and the first pre-set time interval may be set, for example, to 5 minutes. However, this is only an example embodiment, and the first pre-set time interval may be changed to various values by the trained artificial intelligence model. For example, the processor 140 may be configured to monitor whether the user is on-board the public transport 200 for a relatively long period of time, and reduce power consumption by only processing audio signals received through the microphone 110 at a certain time interval according to a monitoring result. For example, the first pre-set time interval may be adjusted to have longer intervals if the user is on-board the public transport 200 for a relatively long period of time.

Further, the processor 140 may be configured to determine, based on the user being determined as on-board the public transport 200, whether the voice signal detected in the audio signal received through the microphone 110 is a voice signal output through the acoustic device 250 of the public transport 200.

According to an embodiment, the processor 140 may be configured to detect, based on the user being determined as on-board the public transport 200, the audio signal of a section in which a level of the audio signal received through the microphone 110 exceeds a pre-set level as a voice signal. For example, the processor 140 may be configured to detect the audio signal of a section in which the level of the audio signal received through the microphone 110 is less than a pre-set level as a silence signal. This is to reduce computational quantity by reducing the subjects of data processing by determining the audio signal of a portion section from among the audio signals as the voice signal, and processing only the voice signals. The level of the audio signal may be expressed in decibels (dB), voltages, or energy units.

In an embodiment, the processor 140 may be configured to detect, based on the user being determined as on-board the public transport 200, a voice signal from the audio signal received through the microphone 110 at a second pre-set time interval which is shorter than the first pre-set time interval. That is, the second pre-set time interval may represent a period of time for performing a corresponding operation. The second pre-set time interval may be a value pre-set by the manufacturer or the user, and the second pre-set time interval may be set, for example, to a time close to real-time. However, this is only an example embodiment, and the second pre-set time interval may be changed to various values. This is to accurately provide the guidance information to the user so as to not miss important information from the environment of the user by monitoring the audio signal on ambient sounds for at a shorter interval, and detecting an announcement broadcast which may be output from the acoustic device 250 of the public transport 200.

The processor 140 may be configured to determine whether the detected voice signal is a voice signal output from the acoustic device 250.

Further, the processor 140 may be configured to determine, based on the detected voice signal being determined as a voice signal output from the acoustic device 250, whether the voice signal detected based on the information on the plurality of stops includes a voice signal for guiding one stop from among the plurality of stops.

The processor 140 may be configured to use various algorithms such as a trigger word detection algorithm and keyword spotting to set the respective stops from the information on the plurality of stops stored in the memory 130 as keywords. Then, the processor 140 may be configured to detect a pre-set keyword (e.g., "stop") from the detected voice signal.

The processor 140 may be configured to determine, based on at least one from among the pre-set keywords being detected from the detected voice signal, the detected voice signal as including a voice signal for guiding one stop from among the plurality of stops. That is, the processor 140 may be configured to determine, based on the pre-set keyword being included in the detected voice signal, the detected voice signal as including a voice signal for guiding one stop from among the plurality of stops.

Alternatively, the processor 140 may be configured to determine, based on none of the pre-set keywords being detected from the detected voice signal, the detected voice signal as not including a voice signal for guiding one stop from among the plurality of stops. That is, the processor 140 may be configured to determine, based on the pre-set keyword not being included in the detected voice signal, the detected voice signal as not being directed to guiding one stop from among the plurality of stops.

For example, the processor 140 may be configured to set respective stops such as, and without limitation, Gangnam Station, Samseong Station, Nonhyeon Station, or the like from the information on the plurality of stops stored in the memory 130 as keywords.

Here, the processor 140 may be configured to detect "Samseong Station" which is one from among the pre-set keywords from the voice signal detected in a context such as "this stop is Samseong Station." The processor 140 may be configured to determine, based on the pre-set keyword being detected from the detected voice signal, the detected voice signal as including a voice signal for guiding one stop from among the plurality of stops. As another example, the processor 140 may be configured to determine that the pre-set keyword is not detected from the voice signal detected in a context such as "please use a different door if the door is busy." The processor 140 may be configured to determine, based on the pre-set keyword not being detected from the detected voice signal, the detected voice signal as not including a voice signal for guiding a stop from among the plurality of stops.

In an embodiment, the processor 140 may be configured to perform, based on the detected voice signal being determined as a voice signal output from the acoustic device 250, an operation of determining whether the detected voice signal includes a voice signal for guiding stops and an operation of performing voice recognition on the detected voice signal in parallel.

Here, the operation of performing voice recognition on the detected voice signal may be preliminarily performed when the voice signal for guiding stops is not included in the detected voice signal, and provide a result of having performed the voice recognition.

Specifically, the processor 140 may be configured to perform the operation of determining whether the detected voice signal includes the voice signal for guiding a stop, and the operation of performing voice recognition on the detected voice signal simultaneously. This is to provide the user more quickly the result of the voice recognition by performing an operation which performs voice recognition on a pre-detected voice signal considering that the time at which the voice recognition on the detected voice signal is completed takes longer than the time at which the operation determines whether the detected voice signal includes a voice signal for guiding the stop is completed.

In another embodiment, the processor 140 may be configured to perform, based on the detected voice signal being determined as a voice signal output from the acoustic device 250, the operation of determining whether the detected voice signal includes a voice signal for guiding the stop. Alternatively, based on the detected voice signal being determined as not including the voice signal for guiding the stop, the processor 140 may be configured to perform the voice recognition on the detected voice signal.

Further, the processor 140 may be configured to control, based on the detected voice signal being determined as including the voice signal for guiding the stop, the output interface 120 to output information on the stop.

Specifically, the processor 140 may be configured to control the output interface 120 to output information on stops included in the detected voice signal. Here, the output interface 120 may include at least one from among a speaker 121 (referring to FIG. 6) and a display 122 (referring to FIG. 6).

In an example, based on the electronic apparatus 100 including a speaker 121, the processor 140 may be configured to control the speaker 121 to provide information on the stop included in the detected voice signal in auditory form.

As a specific example, the processor 140 may be configured to combine, based on the detected voice signal (e.g., "This stop is Samseong Station.") being determined as including a voice signal for guiding the stop (e.g., "Samseong Station"), information on the stop (e.g., "Samseong Station") included in the detected voice signal to a specific position of a pre-set sentence (e.g., "This stop is XXX."). Further, the processor 140 may be configured to control the speaker 121 to output a combined sentence such as "this stop is Samseong Station" as an audio signal by using text to speech (TTS) which converts data in text form to a voice signal.

The processor 140 may be configured to control the speaker 121 to reduce an audio level (i.e., a unit representing a magnitude of sound; e.g., dB, etc.) of the audio signal being output at a first pre-set level, and output information on the stop included in the detected voice signal as an audio signal having a second pre-set level based on the detected voice signal being determined as including a voice signal for guiding the stop while outputting an audio signal on content (e.g., content such as music, game, image, etc.) through the speaker 121.

The first pre-set level may be smaller than the second pre-set level. For example, the level of the speaker 121 may be from 0 to 10, and the volume output from the speaker 121 may be greater as the level is higher. For example, the first pre-set level may be set as 0 (or, 1, etc.), and the second pre-set level may be set as 5. However, this is only an example embodiment, and the processor 140 may be configured to output, based on the detected voice signal being determined as including the voice signal for guiding the stop, the audio signal level (e.g., 5) which is currently being output to a level (e.g., 3) which is decreased by a pre-set level (e.g., 2) by setting 0 as a lower limit. As described above, various modifications may be possible.

Further, the processor 140 may be configured to restore, after the output of information on the stop is completed, the level of the audio signal on the content to the first pre-set level which is a level prior to being decreased. This is to accurately transfer information on the stop to the user.

In an example, based on the electronic apparatus 100 including the display 122, the processor 140 may be configured to control the display 122 to provide information on the stop included in the detected voice signal in a visual form.

As a specific example, the processor 140 may be configured to combine, based on the detected voice signal (e.g., "This stop is Samseong Station.") being determined as including the voice signal for guiding the stop (e.g., "Samseong Station"), information on the stop (e.g., "Samseong Station") included in the detected voice signal to a specific position of a pre-set sentence (e.g., "This stop is XXX."). Further, the processor 140 may be configured to control the display 122 to display the combined sentence in the user interface (UI). The UI may include visual information such as a text and an image. The UI may be displayed at one area (e.g., an edge area, a central area, an upper end area, a lower end area, a left side area, a right side area, or the like of the display 122) of the display 122. The UI may be implemented to forms such as the form of a visual feedback (e.g., edge lighting), a popup message, or a notification bar.

However, this is only an example embodiment, and the processor 140 may be configured to output information on the stop included in the voice signal detected through the speaker 121 and the display 122 simultaneously, or provide information on the stop included in the voice signal detected by generating vibrations through a haptic motor.

In an embodiment, the processor 140 may be configured to terminate, based on the detected voice signal being determined as including the voice signal for guiding the stop, the voice recognition being performed in parallel. This may reduce load on the processor 140 by not performing further voice recognition when the detected voice signal includes the voice signal for guiding the stop.

In another embodiment, the processor 140 may be configured to continue with the voice recognition which is being performed based on the detected voice signal not including the voice signal for guiding the stop. The processor 140 may be configured to obtain information which corresponds to the result of the completed voice recognition when the voice recognition which is being performed is completed. The processor 140 may be configured to control the output interface 120 to output the obtained information. Here, the method of outputting the information may be in a manner similar to those described above with respect to the speaker 121 and the display 122.

Figure 3:
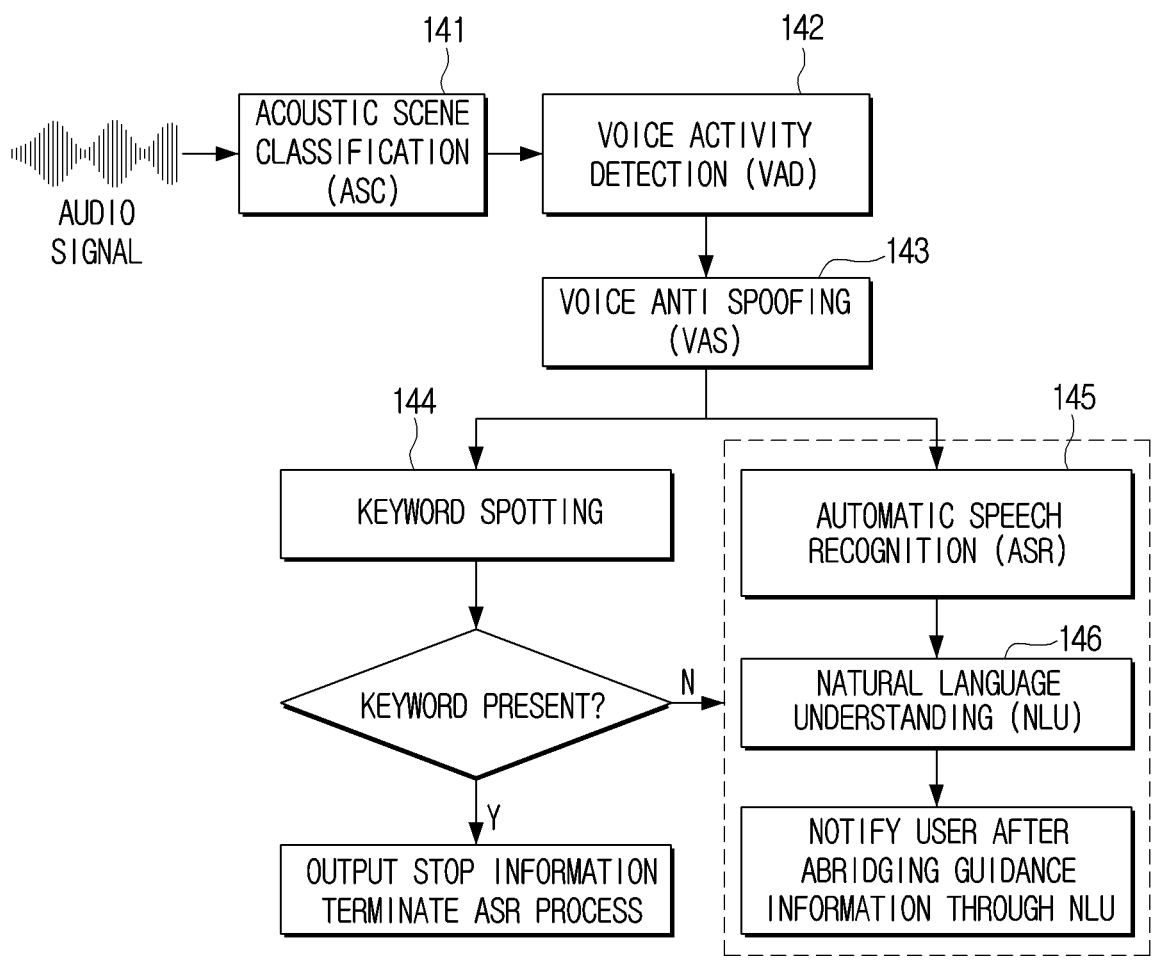
FIG. 3 is a flowchart illustrating an operation of an electronic apparatus according to an embodiment.

The voice recognition may be performed through an automatic speech recognition (ASR) module 145 and a natural language understanding (NLU) module 146 (shown in FIG. 3).

The automatic speech recognition (ASR) module 145 may convert the detected voice signal to text (string) of words, phoneme sequence, or the like by using a language model and an acoustic model. The language model may be a model that assigns probability to a word or a phoneme sequence and the acoustic model may be a model representing a relationship between a voice signal and a text of the voice signal. The models may be configured based on a probability statistics or an artificial neural network.

The natural language understanding (NLU) module 146 may identify a meaning of a word or a sentence which includes a text by using a variety of analysis methods such as a morphological analysis, a syntactic analysis, and a semantic analysis with respect to the converted text, comprehend an intent of a voice based on the identified meaning, and obtain a response information corresponding to the identified meaning. Here, the response information may be in text form.

For example, the processor 140 may be configured to determine that the voice signal detected with "please use a different door if the door is busy" does not include the voice signal for guiding the stop. Here, the processor 140 may be configured to continue with the voice recognition. The processor 140 may be configured to obtain, based on the voice recognition being completed, response information corresponding to the result of the completed voice recognition. For example, the response information corresponding to the result of the completed voice recognition may be information such as "please use a different door" which abridges the detected voice signal such as "please use a different door if the door is busy." Then, the processor 140 may be configured to control the output interface 120 to output the obtained information.

The above-described voice recognition may be performed through the external apparatus. To this end, the electronic apparatus 100 may further include a communicator 150 (referring to FIG. 6) for performing communication with the external apparatus.

In an embodiment, the processor 140 may be configured to control, based on the detected voice signal being determined as including the voice signal for guiding the stop, the communicator 150 to transmit the detected voice signal to the external apparatus for voice recognition. The external apparatus for voice recognition may be implemented through various electronic apparatuses such as a server apparatus and a user smartphone. Further, the external apparatus may be configured to perform voice recognition on the received voice signal. The external apparatus may be configured to obtain information which corresponds to the result of voice recognition by performing voice recognition on the voice signal, and transmit the obtained information to the electronic apparatus 100.

The processor 140 may be configured to control, based on receiving the result of voice recognition through the communicator 150 from the external apparatus, the output interface 120 to output the received information.

Figure 4:
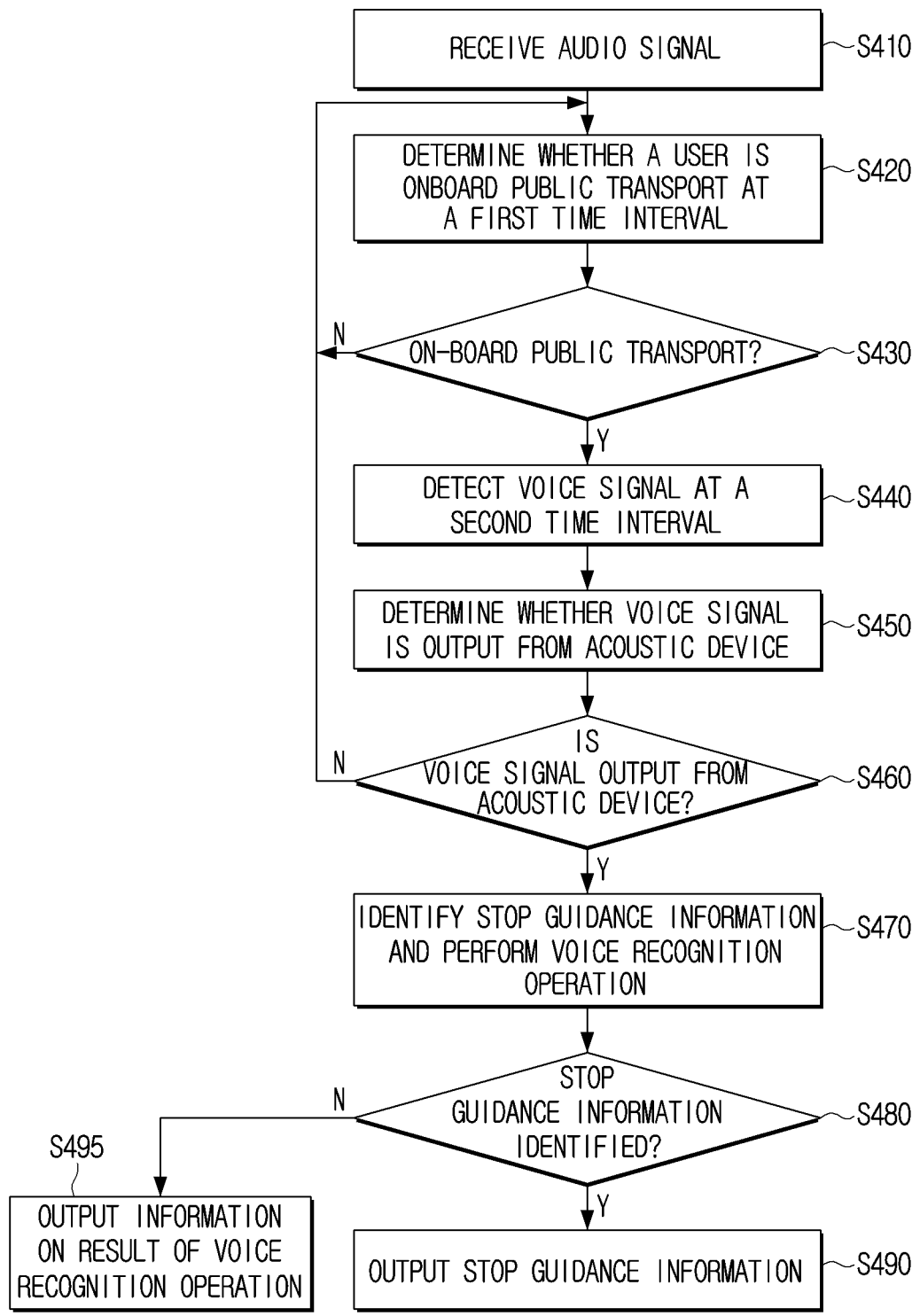
FIG. 4 is a flowchart illustrating a detailed operation of an electronic apparatus according to an embodiment.

FIG. 3 is a flowchart illustrating an operation of an electronic apparatus according to an embodiment. FIG. 4 is a flowchart illustrating a detailed operation of an electronic apparatus according to an embodiment.

Referring to FIG. 3, the memory 130 of the electronic apparatus 100 may store various modules in which various operations are programmed, and the processor 140 may be configured to perform the above-described operations by executing the respective modules.

Referring to FIGS. 3 and 4, the processor 140 may be configured to receive an audio signal through the microphone 110 (S410).

The processor 140 may be configured to determine, through the acoustic scene classification (ASC) module 141, whether the user is on-board the public transport 200 based on the audio signal (S420). Here, the ASC module 141 may input the audio signal to the artificial intelligence model (i.e., the artificial intelligence model trained to determine whether the user is on-board the public transport 200 based on the audio signal on the inside environment of the public transport 200) stored in the memory 130, and determine whether the user is on-board the public transport 200 through the output data. In addition, the ASC module 141 may determine whether the user is on-board the public transport 200 at the first pre-set time intervals with respect to the audio signal which is received consecutively in time.

Based on the user being determined as on-board the public transport 200 (S430: Yes), the processor 140 may be configured to detect the audio signal of a section in which the level of the audio signal exceeds the pre-set level as the voice signal through a voice activity detection (VAD) module 142 (S440). The VAD module 142 may detect the voice signal at the second pre-set time intervals which is shorter than the first pre-set time intervals with respect to the audio signal which is received consecutively in time.

The processor 140 may be configured to determine, through a voice anti spoofing (VAS) module 143, whether the detected voice signal is a voice signal output through the acoustic device 250 of the public transport 200 (S450).

Based on the detected voice signal being determined as the voice signal output through the acoustic device 250 of the public transport 200 (S460: Yes), the processor 140 may be configured to determine whether the voice signal includes a voice signal for guiding a stop through a keyword spotting module 144, and perform voice recognition on the voice signal detected through the automatic speech recognition (ASR) module 145 and the natural language understanding (NLU) module 146 simultaneously (S470).

The processor 140 may be configured to control, based on the detected voice signal being determined as including the voice signal for guiding the stop (S480: Yes), the output interface 120 to output information on the stop (S490). At this time, the processor 140 may terminate the voice recognition which is being performed in parallel.

Alternatively, the processor 140 may be configured to continue the voice recognition which is being performed through at least one from among the ASR module 145 and the NLU module 146 based on the detected voice signal not including the voice signal for guiding the stop (S480: No). The processor 140 may be configured to obtain information which corresponds to the result of the completed voice recognition when the voice recognition which is being performed is completed. The processor 140 may be configured to control the output interface 120 to output the obtained information (S495).

Figure 5:
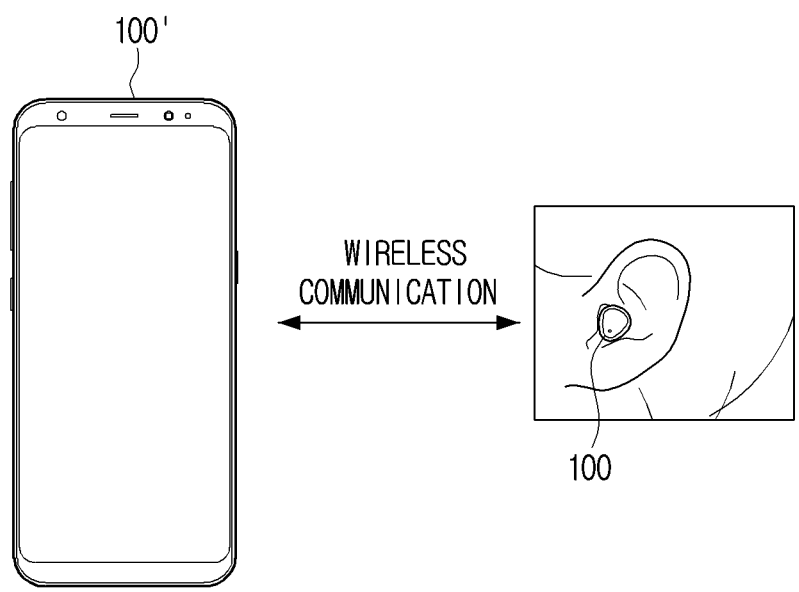
FIG. 5 is a diagram illustrating an operation of an electronic apparatus linked with another external apparatus according to an embodiment.

FIG. 5 is a diagram illustrating an operation of an electronic apparatus linked with an external apparatus according to an embodiment.

Referring to FIG. 5, the electronic apparatus 100 may be configured to perform communication with another electronic apparatus 100'. That is, the another electronic apparatus 100' may be an external apparatus with respect to the electronic apparatus 100. To this end, the electronic apparatus 100 may further include a communicator 150 (referring to FIG. 6). Here, the communicator 150 may be configured to use various wired communication methods or wireless communication methods and perform communication with another electronic apparatus 100'. The communicator 150 may be configured to transmit data to another apparatus 100' or receive data from another apparatus 100'.

According to an embodiment, the electronic apparatus 100 and the another electronic apparatus 100' may associate with each other. That is, the electronic apparatus 100 and the another electronic apparatus 100' may divide and perform the above-described operations. Here, the another electronic apparatus' may be implemented through various electronic apparatuses such as the server apparatus and the user smartphone.

In an example, the electronic apparatus 100 may be configured to perform an operation (S410) of receiving the audio signal, and transmit the received audio signal to the another electronic apparatus 100'.

The another electronic apparatus 100' may include the ASC module 141, the VAD module 142, the VAS module 143, the keyword spotting module 144, the ASR module 145, and the NLU module 146. The another electronic apparatus 100' may be configured to transmit, based on operations S420 to S480 being performed and information on the stop guidance information or the result of the voice recognition operation being obtained from the another electronic apparatus 100', the obtained information to the electronic apparatus 100.

The electronic apparatus 100 may be configured to output the received information through the output interface 120 (S490 and/or S495).

In another example, the electronic apparatus 100 may be configured to perform operations S410 to S460, and based on the detected voice signal being determined as the voice signal output through the acoustic device 250 of the public transport 200 (S460: Yes), perform the operation of determining whether the voice signal includes the voice signal for guiding the stop.

The electronic apparatus 100 may be configured to control, based on the detected voice signal being determined as including the voice signal for guiding the stop (S480: Yes), the output interface 120 to output information on the stop (S490).

Alternatively, the electronic apparatus 100 may be configured to transmit, based on the detected voice signal being determined as not including the voice signal for guiding the stop (S480, No), the detected voice signal to the another electronic apparatus 100'. For example, the another electronic apparatus 100' may include the ASR module 145 and the NLU module 146, and the another electronic apparatus 100' may be configured to proceed with voice recognition on the received voice signal through the ASR module 145 and the NLU module 146, and obtain information corresponding to the result of voice recognition. The another electronic apparatus 100' may be configured to transmit the obtained information to the electronic apparatus 100. Then, the electronic apparatus 100 may be configured to output the received information through the output interface 120 (S495).

The above-described examples are only example embodiments, and the operation of associating between the electronic apparatus 100 and the another electronic apparatus 100' may be possible through various combinations.

In still another embodiment, the electronic apparatus 100 may be configured to output, based on the detected voice signal being determined as including the voice signal for guiding the stop (S480: Yes), information on the stop through the output interface 120 (S490). Based on the output interface 120 being the speaker 121, the electronic apparatus 100 may be configured to output information on the stop in sound form through the speaker 121. For example, the electronic apparatus 100 may be configured to transmit the information on the stop to the another electronic apparatus 100', and the another electronic apparatus 100' may be configured to display the received information on the stop in a display of the another electronic apparatus 100' in a form such as an image.

Based on the voice signal detected in a similar method to the above being determined as not including the voice signal for guiding the stop (S480: No), the electronic apparatus 100 may be configured to obtain information which corresponds to the result of voice recognition, and output the obtained information in sound form through the speaker 121. In this case, the electronic apparatus 100 may be configured to transmit the obtained information to the another electronic apparatus 100', and the another electronic apparatus 100' may be configured to display the received information in the display of the another electronic apparatus 100' in forms such as an image.

Figure 6:
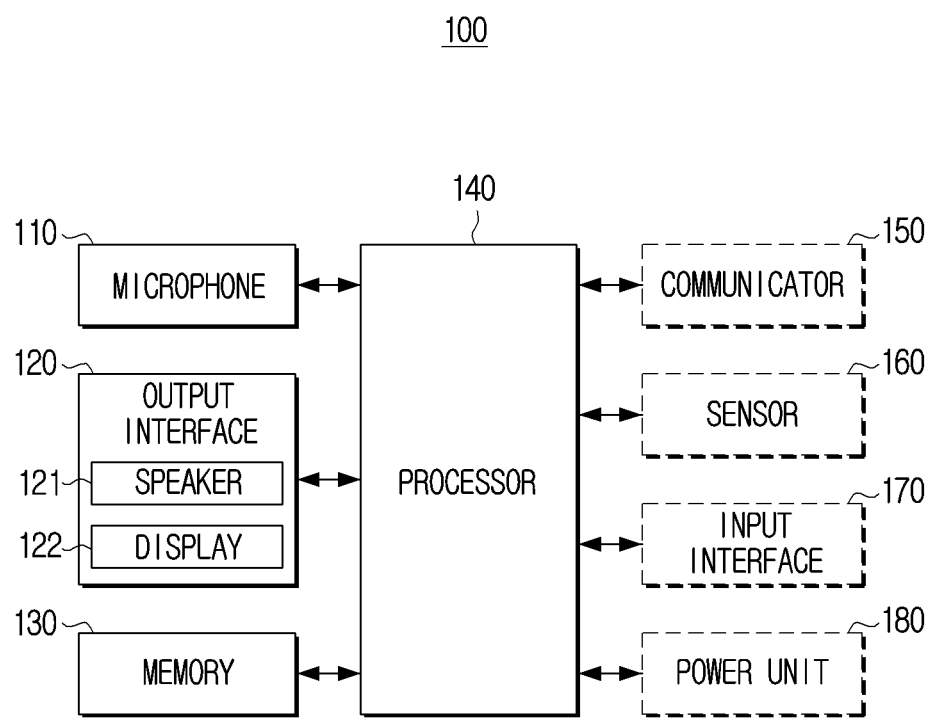
FIG. 6 is a block diagram illustrating a supplementary configuration of an electronic apparatus according to an embodiment.

FIG. 6 is a block diagram illustrating an electronic apparatus according to an embodiment.

Referring to FIG. 6, the electronic apparatus 100 according to an embodiment may further include a communicator 150, a sensor 160, an input interface 170, and a power unit 180 in addition to the microphone 110, the output interface 120, the memory 130, and the processor 140 shown in FIG. 2. Because the microphone 110, the output interface 120, the memory 130, and the processor 140 has been described above, redundant descriptions will be omitted.

The output interface 120 may include the speaker 121 and the display 122. The display 122 may be an apparatus that outputs information or data in a visual form. The speaker 121 may be configured to output not only various audio data to which various processing work such as decoding, amplification, or noise filtering are performed by an audio processor, but also various notification sounds or voice message as sound. The display 122 may be configured to display an image frame in one area or a whole area of the display which is operable with pixels. At least a portion of the display 122 may be coupled to at least one from among the front surface area, the side surface area, and the rear surface area of the electronic apparatus 100 in a flexible display form. The flexible display may be twistable, bendable, or rollable without damaging a substrate that is thin and flexible like paper. The memory 130 may be store an operating system (OS) for controlling the overall operations of the electronic apparatus 100 and various data associated with the elements of the electronic apparatus 100.

The memory 130 may be hardware that stores data or information temporarily or permanently. For example, the memory 130 may be implemented with at least one hardware from among a non-volatile memory, a volatile memory, a flash memory, a hard disk drive (HDD), a solid state drive (SDD), a random access memory (RAM), a read only memory (ROM), or the like.

The communicator 150 may be configured to transmit and receive data of various types by performing communication with an external apparatus of various types according to a communication method of various types. The communicator 150, as a circuit configured to perform wireless communication of various methods, may include at least one from among a Bluetooth module (Bluetooth or Bluetooth low energy method), a Wi-Fi module (Wi-Fi method), a wireless communication module (a cellular method such as 3G, 4G, 5G, etc.), a NFC (near field communication) module (NFC method), an infrared module (infrared method), a ZigBee module (ZigBee method), an ultra-wideband (UWB) module (UWB method), and an ultrasonic module (ultrasonic method), and perform wired communication including at least one from among an Ethernet module, a universal serial bus (USB) module, a high definition multimedia interface (HDMI), a display port (DP), a D-subminiature (D-SUB), a digital visual interface (DVI), a Thunderbolt, and a component.

The sensor 160 may be implemented as various sensors such as, for example, and without limitation, a camera, a microphone, a proximity sensor, an illuminance sensor, a motion sensor, a ToF sensor, a GPS sensor, or the like. For example, the camera may divide light into pixel units, detect intensity of light with respect to red (R), green (G) and blue (B) colors for respective pixels, and obtain data which represents a color, a shape, a contrast, or the like of an object by converting the intensity of light into an electrical signal. At this time, the type of data may be an image having R, G and B color values with respect to respective pixels. The microphone may be configured to detect sound waves such as a user voice, and obtain data by converting a sound wave to an electrical signal. At this time, the type of data may be an audio signal of various formats. The proximity sensor may detect a presence of a surrounding object, and obtain data on whether the surrounding object is present or whether it is in close proximity of the surrounding object. The illuminance sensor may be configured to detect an amount of light (or, brightness) on the surrounding environment of the electronic apparatus 100, and obtain data on the illuminance. The motion sensor may be configured to detect a moving distance, a moving direction, a gradient, or the like of the electronic apparatus 100. To this end, the motion sensor may be implemented through the coupling of an acceleration sensor, a gyro sensor, a geomagnetic sensor, or the like. The Time of Flight (ToF) sensor may be configured to detect the time of flight of various electromagnetic waves (e.g., ultrasonic waves, infrared rays, lasers, ultra-wideband (UWB), etc.) having a specific speed returning after being emitted, and obtain data on the distance (or location) with the subject. The global positioning system (GPS) sensor may be configured to receive radio-wave signals from a plurality of satellites, calculate respective distances with the respective satellites by using the transference time of the received signals, and obtain data on the current location of the electronic apparatus 100 by using a triangulation of the calculated distance. However, the above-described sensor 160 is some examples of the embodiment and is not limited thereto, and may be implemented with sensors of various types.

The input interface 170 may be configured to receive various user commands and transfer to the commands to the processor 140. That is, the processor 140 may be configured to recognize the user command input from the user through the input interface 170. Here, the user command may be realized through various methods such as, for example, and without limitation, a touch input (touch panel) of the user, an input of pressing a key or a button, a voice input which is uttered by the user, or the like.

The power unit 180 may be configured to supply or block power with respect to the respective configurations of the electronic apparatus 100. The power unit 180 may include a battery for supplying power, and the battery may be charged according to a wired charging method or a wireless charging method.

FIG. 7 is a diagram illustrating a flowchart according to an embodiment.

Referring to FIG. 7, a control method of the electronic apparatus 100 according to an embodiment may include, based on the audio signal received through the microphone 110, determining whether the user is on-board the public transport (S710). The control method may include, based on the user being determined as on-board the public transport 200, determining whether the voice signal detected from the audio signal which is received through the microphone 110 is the voice signal output through the acoustic device 250 of the public transport 200 (S720). The control method may include, based on the detected voice signal being determined as the voice signal output from the acoustic device 250, determining whether the voice signal detected based on the information on the plurality of stops includes the voice signal for informing one stop from among the plurality of stops (S730). The control method may include, based on the detected voice signal being determined as including the voice signal for informing the stop, outputting information on the stop (S740).

Specifically, based on the audio signal received through the microphone 110, the electronic apparatus may determine whether the user is on-board the public transport 200 (S710).

In an embodiment, the electronic apparatus 100 may be configured to store the artificial intelligence model trained to determine whether the user is on-board the public transport 200 based on the audio signal on the inside environment of the public transport 200. Specifically, the determining whether the user is on-board the public transport 200 may include inputting the audio signal received through the microphone 110 to the artificial intelligence model. Then, the electronic apparatus 100 may determine whether the user is on-board the public transport 200 through the output of the artificial intelligence model.

In an embodiment, the determining whether the user is on-board the public transport 200 may include determining, based on the audio signal received through the microphone 110, whether the user in on-board the public transport 200 at a first pre-set time interval.

Then, based on the user being determined as on-board the public transport 200, determining whether the voice signal detected from the audio signal received through the microphone 110 is the voice signal output through the acoustic device 250 of the public transport 200 (S720).

To this end, the control method may further include detecting, based on the user being determined as being on-board the public transport 200, the audio signal of a section in which the level of the audio signal received through the microphone 110 exceeds the pre-set level as the voice signal.

In an embodiment, the determining whether the detected voice signal is the voice signal output from the acoustic device 250 may include, based on the user being determined as being on-board the public transport 200, detecting the voice signal from the audio signal received through the microphone 110 at every second pre-set time interval which is shorter than the first pre-set time interval, and determining whether the detected voice signal is the voice signal output from the acoustic device 250.

Then, based on the detected voice signal being determined as the voice signal output from the acoustic device 250, it may be determined whether the voice signal detected based on information on the plurality of stops includes the voice signal for guiding one stop from among the plurality of stops (S730).

In an embodiment, the determining whether the voice signal for guiding the stop is included may include, based on the detected voice signal being determined as the voice signal output from the acoustic device 250, performing in parallel the operation of determining whether the detected voice signal includes the voice signal for guiding the stop and the operation of performing voice recognition on the detected voice signal.

Then, based on the detected voice signal being determined as including the voice signal for guiding the stop, output information on the stop (S740).

In an embodiment, the outputting information on the stop may include terminating, based on the detected voice signal being determined as including the voice signal for guiding the stop, the voice recognition which is being performed.

In another embodiment, based on the detected voice signal being determined as not including the voice signal for guiding the stop, continue performing the voice recognition. Further, when the voice recognition which is being performed is completed, obtain information which corresponds to the result of the completed voice recognition. Then, the obtained information may be output through the output interface.

In an embodiment, the outputting information on the stop may include, based on the detected voice signal being determined as including the voice signal for guiding the stop, transmitting the detected voice signal to the external apparatus for voice recognition. Then, based on information which corresponds to the result of voice recognition being performed according to the transmitted voice signal being received from the external apparatus, outputting the received information.

The one or more embodiments of the disclosure may be implemented with software including instructions stored in a machine-readable storage media (e.g., a computer). The machine may execute an instruction stored in the storage medium, and as a device capable of operating according to the executable instruction, may include an electronic apparatus (e.g., electronic apparatus 100) according to the abovementioned embodiments. Based on the instruction being executed by the processor, the processor may perform a function corresponding to the instruction. The instructions may include code generated by a compiler or executed by an interpreter. The machine-readable storage medium may be provided in the form of a non-transitory storage medium. Herein, 'non-transitory' may mean that the storage medium is tangible and does not include a signal, and the term does not differentiate data being semi-permanently stored and data temporarily being stored in the storage medium. For example, the 'non-transitory storage medium' may include a buffer in which data is temporarily stored.

The method according to the various embodiments may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product (e.g., downloadable app) may be at least stored temporarily in a storage medium such as a server of a manufacturer, a server of an application store, or a memory of a relay server, or temporarily generated.

The respective elements (e.g., a module or a program) according to various embodiments may be comprised of a single entity or a plurality of entities, and some sub-elements from among the abovementioned sub-elements may be omitted or other sub-elements may be further included in the various embodiments. Alternatively or additionally, some elements (e.g., modules or programs) may be integrated into one entity to perform the same or similar functions performed by respective corresponding elements prior to integration. Operations performed by a module, program, or other element, in accordance with the various embodiments, may be performed sequentially, in parallel, repetitively, or in a heuristically manner, or at least some operations may be performed in a different order, omitted, or a different operation may be added.

Some of the embodiments of the disclosure have been shown and described above. However, the one or more embodiments of the disclosure are not limited to the aforementioned specific embodiments. It may be understood that various modifications, substitutions, improvements and equivalents thereof can be made without departing from the spirt and scope of the disclosure. It should be understood that such modifications, substitutions, improvements and equivalents thereof shall fall within the protection scope of the disclosure, and should not to be construed independent from the inventive concept or prospect of the disclosure.

What is claimed is:

1. An electronic apparatus, comprising:
a microphone;
an output interface;
a memory configured to store information on a plurality of stops and an artificial intelligence model trained to determine whether a user is on a public transport; and
a processor configured to:
receive a first audio signal through the microphone,
obtain a probability in which the user is on the public transport by inputting the received first audio signal into the artificial intelligence model at a first pre-set time interval,
determine whether the user is on the public transport based on the probability;
based on determining that the user is on the public transport, identify whether a section of a second audio signal in which a level of the received first audio signal exceeds a pre-set level is detected at a second pre-set time interval which is shorter than the first pre-set time interval, based on identifying that the section of the second audio signal is detected, determine that the received first audio signal includes a voice signal output from an acoustic device of the public transport and determine the section of the second audio signal as the voice signal output from the acoustic device of the public transport, determine whether the voice signal output from the acoustic device of the public transport comprises a voice signal for guiding at least one stop from among the plurality of stops according to the information on the plurality of stops; and based on determining that the voice signal output from the acoustic device of the public transport comprises the voice signal for guiding the at least one stop, control the output interface to output information on the at least one stop.

2. The electronic apparatus of claim 1, wherein the processor is further configured to, based on detecting the voice signal output from the acoustic device of the public transport, perform an operation of determining whether the voice signal output from the acoustic device of the public transport, comprises the voice signal for guiding the at least one stop and an operation of performing voice recognition on the voice signal output from the acoustic device of the public transport, in parallel.

3. The electronic apparatus of claim 2, wherein the processor is further configured to, based on determining that the voice signal output from the acoustic device of the public transport comprises the voice signal for guiding the at least one stop, terminate the voice recognition.

4. The electronic apparatus of claim 2, wherein the processor is further configured to, based on the voice signal output from the acoustic device of the public transport, being determined as not comprising the voice signal for guiding the at least one stop, continue performing the voice recognition, and based on the voice recognition being completed, obtain information corresponding to a result of the completed voice recognition, and control the output interface to output the obtained information.

5. The electronic apparatus of claim 1, further comprising:
a communicator;
wherein the processor is configured to:
based on the voice signal output from the acoustic device being determined as comprising the voice signal for guiding the at least one stop, control the communicator to transmit the voice signal for guiding the at least one stop to an external apparatus for voice recognition, and
based on receiving a result of the voice recognition through the communicator from the external apparatus, control the output interface to output the received information.

6. A control method of an electronic apparatus, the method comprising:
receiving a first audio signal through a microphone;
obtaining a probability in which a user is on a public transport by inputting the received first audio signal into an artificial intelligence model at a first pre-set time interval;
determining whether the user is on the public transport based on the probability;
based on determining that the user is on the public transport, identifying whether a section of a second audio signal in which a level of the received first audio signal exceeds a pre-set level is detected at a second pre-set time interval which is shorter than the first pre-set time interval;
based on identifying that the section of the second audio signal is detected, determining that the received first audio signal includes a voice signal output from an acoustic device of the public transport and determining the section of the second audio signal as the voice signal output from the acoustic device of the public transport;
determining whether the voice signal output from the acoustic device of the public transport comprises a voice signal for guiding at least one stop from among a plurality of stops; and
based on determining that the voice signal output from the acoustic device of the public transport comprises the voice signal for guiding the at least one stop, outputting information on the at least one stop.

7. The method of claim 6, further comprises:
based on detecting the voice signal output from the acoustic device of the public transport, determining whether the voice signal output from the acoustic device of the public transport comprises the voice signal for guiding the at least one stop and performing voice recognition on the voice signal for guiding the at least one stop, in parallel.

8. The method of claim 7, wherein the outputting information on the at least one stop comprises, based on determining that the voice signal output from the acoustic device of the public transport comprises the voice signal for guiding the at least one stop, terminating the voice recognition.

9. The method of claim 7, further comprising:
based on determining that the voice signal output from the acoustic device of the public transport does not include the voice signal for guiding the at least one stop, continue performing the voice recognition;
based on the voice recognition being completed, obtaining information corresponding to a result of the completed voice recognition; and
outputting the obtained information.

\* \* \* \* \*